G. MATHESON.
Device for Drawing and Welding Tubing.
No. 164,011. Patented June 1, 1875.
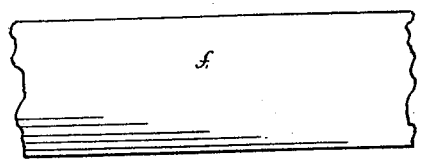
fig:1.
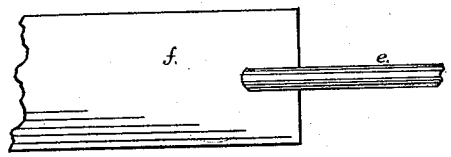
fig:2.
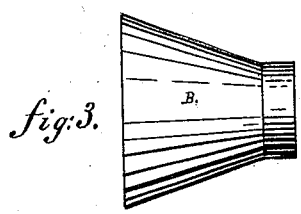
fig:3.
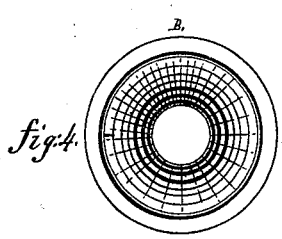
fig:4.
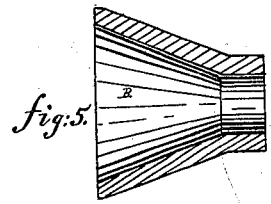
fig:5.
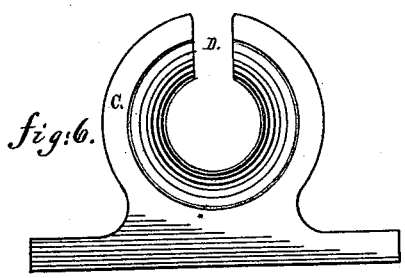
fig:6.
fig:7.
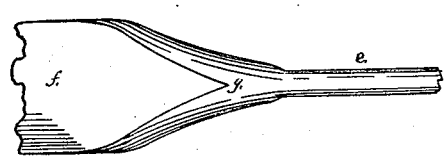
fig:8.
fig:9.
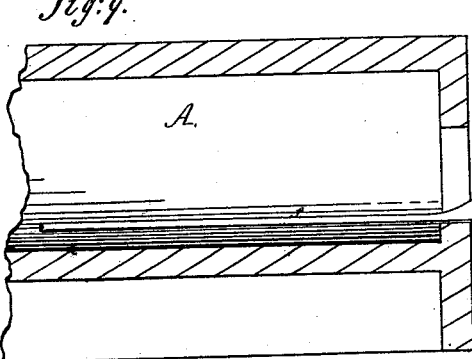
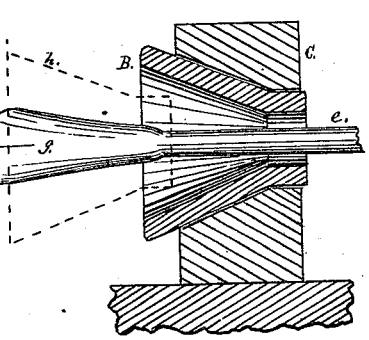
Witnesses.
James J. Johnston
A. H. Johnston
Inventor.
George Matheson
By A. C. Johnstone
his Atty

UNITED STATES PATENT OFFICE.

GEORGE MATHESON, OF McKEESPORT, PENNSYLVANIA, ASSIGNOR TO HIMSELF AND THE NATIONAL TUBE-WORKS COMPANY, OF SAME PLACE.

IMPROVEMENT IN DEVICES FOR DRAWING AND WELDING TUBING.

Specification forming part of Letters Patent No. 164,011, dated June 1, 1875; application filed March 25, 1875.

*To all whom it may concern:*

Be it known that I, GEORGE MATHESON, of McKeesport, in the county of Allegheny and State of Pennsylvania, have invented a new and useful Improvement in Method of Constructing Butt-Weld Pipe; and I do hereby declare that the following is a full and exact description thereof, reference being had to the accompanying drawings and to the letters of reference marked thereon.

My invention relates to an improvement in method of constructing wrought-iron pipe; and consists in skelping and welding buttweld pipe by heating the iron to a welding heat and drawing it from a heating-furnace through a matrix, whereby the process of skelping and welding in the manufacture of wrought-iron pipe is accomplished at a single operation.

To enable others skilled in the art to make and use my improvement, I will proceed to describe its construction and operation.

In the accompanying drawings, which form part of my specification, Figure 1 represents a section of the bar of iron from which the pipe is formed. Fig. 2 represents a tang secured to the iron prior to drawing it through the matrix for the purpose of skelping and welding the pipe. Fig. 3 is a side elevation of the matrix used for skelping and welding the pipe. Fig. 4 is an end view of the matrix. Fig. 5 is a vertical and longitudinal section of the matrix. Fig. 6 is a front view of the holder for the matrix. Fig. 7 is a top view or plan of the matrix-holder. Fig. 8 represents the tang secured to the end of the iron bar from which the pipe is formed, bent around it prior to the operation of drawing it through the matrix. Fig. 9 represents a vertical and longitudinal section of a heating-furnace, and also the position of the matrix and its holder with relation to the furnace, with the drawing-tang passed through the matrix and the iron entering it.

The heating-furnace in my improved method of constructing "butt-weld pipe" is of the ordinary construction. The iron used in the manufacture of the pipe is rolled and heated in the usual manner and by the ordinary means.

A represents the furnace. B represents the matrix, which is bell-mouthed in its bore, the small diameter of its bore corresponding to the diameter of the pipe. C represents the holder for the matrix B, and is furnished with a slot, D, for the drawing-tang to pass through prior to the operation of drawing the heated iron through the matrix for the purpose of skelping and welding it. The matrix-holder is secured in a fixed position in front of the furnace-door, as indicated in Fig. 9. The tang $e$ is secured to the end of the iron bar $f$, which is bent around the tang, as indicated at $g$ in Fig. 8. The iron being heated to the desired degree for welding, the operator places the matrix over the tang $e$, as indicated by the dotted lines $h$ in Fig. 9; he then passes the tang $e$ down through the opening or slot D in the matrix-holder $c$; he then draws on the tang, which will bring the matrix into the holder $c$, as shown in Fig. 9; he then, by suitable means and power, draws on the tang $e$, on a line concentric to the axis of the bore of the matrix B, which will draw the iron from the furnace and through the matrix, and thereby skelp it, weld it, and form into a perfect pipe (known in the trade as "butt-weld" pipe) by a single operation, whereby time and labor are saved, and a better and cheaper pipe is produced than by the means heretofore employed.

Having thus described the nature, construction, and operation of my improvement, what I claim as of my invention is—

The combination of the matrix B with the support or holder C, provided with the slot D, substantially as and for the purpose hereinbefore described and set forth.

GEO. MATHESON.

Witnesses:
W. N. PAXTON,
A. C. JOHNSTON.